United States Patent

[11] 3,542,385

[72] Inventor Karl Seitter
    Thielenbrucher Allee 36, Cologne-Dellbrueck, Germany
[21] Appl. No. 748,104
[22] Filed July 26, 1968
[45] Patented Nov. 24, 1970
[32] Priority July 28, 1967
[33] Germany
[31] No. P1627115.1

[54] CHUCK FOR SHANK TYPE TOOLS
    9 Claims, 10 Drawing Figs.
[52] U.S. Cl. .................................................. 279/51,
    74/107
[51] Int. Cl. ..................................................... B23b 31/10
[50] Field of Search ........................................... 74/107;
    279/51, 43, 46

[56] References Cited
UNITED STATES PATENTS
1,530,227  3/1925  Bourassa ....................  74/107
FOREIGN PATENTS
309,858  0/1929  England ......................  279/51

Primary Examiner—Robert C. Riordon
Assistant Examiner—Donald D. Evenson
Attorney—Lowry, Rinehart, Markva & Smith ABSTRACT: This disclosure provides a chuck for shank type tools which has an adapter sleeve and a clamping element. The adapter sleeve engages the shank of the tool being operated and is actuated through the use of an eccentric shaft located in the chuck housing and in a direction normal to the longitudinal axis of the chuck. A flexible member is placed between the eccentric shaft and the adapter sleeve to provide tensioning for the operation of the chuck.

INVENTOR
KARL SEITTER
BY
Lowry, Rinehart & Markva

INVENTOR
KARL SEITTER
BY
Lowry, Rinehart & Markiw

Patented Nov. 24, 1970 3,542,385

INVENTOR
KARL SEITTER
BY
Lowry, Rinehart & Markva

CHUCK FOR SHANK TYPE TOOLS

BACKGROUND OF THE INVENTION

Prior art chucks used for cylindrical cutter shanks are generally designed to grip the tool shank by means of a longitudinally slotted and radially flexible adapter sleeve. A clamping element generally acts on the flexible adapter sleeve in a longitudinal direction. The clamping element is usually a cap nut acting as a slide screw. By turning the cap nut, the flexible adapter sleeve is pushed into a counter cone thereby exerting a radial clamping force on the tool shank.

This type of prior art chuck assembly is undesirable for several reasons. The large amount of friction generated between the parts during the clamping operation results in a poor working efficiency. This friction created between the thread of the cap nut and the chuck housing and additional friction resulting due to the contact between the surfaces of the adapter sleeve and clamping element result in poor operational efficiency. The adapter sleeves known in the prior art generally have poor flexible deformability. This fact increases the total amount of friction contributing to the inefficiency of the assembly. This combination of difficulties creates a deleterious relationship between the clamping forces and the loosening forces. That is, the clamping forces caused by the twisting movement used to tighten the shank into the chuck and the rotating movement which causes the tool shank to slip during use so that when tool shanks are clamped into prior art chucks with the standard threaded nuts, the clamping and loosening forces are substantially identical. The overall efficiency of the normal clamping devices of those known in the prior art is often below 5 percent. Furthermore, no permanent clamping effect is achieved because there is no flexible member included in the prior art structures.

In another prior art embodiment of a chuck for shank type tools, the tool shank has a thread located at the clamping end. The shank is screwed into a counter thread on the adapter sleeve until a fixed stop on the centralizing bore of the cutter and a fixed point in the body of the chuck meet. If the cutter tool slips, the thread and stop force automatically retighten the cutter tool. One of the biggest disadvantages of this type of prior art chuck is that loosening of the tool after use is even more difficult than the normal cap nut type of tool chuck. The powerful axial pressure created on retightening could easily lead to the damage of small cutter tool points and tool diameters along the centralizing bore. In addition, the threading of the end of the tool shank increases the total overall production cost for the cutter tools.

SUMMARY OF THE INVENTION

The object of this invention is to provide a chuck for shank type tools in which the efficiency of the clamping is considerably increased and the clamping moment is reduced.

Another object of this invention is to provide a chuck having a contact eccentric drive which moves the adapter sleeve in an axial direction only and prevents any peripheral friction upon tightening and loosening of the adapter sleeve.

Another object of this invention is to provide an eccentric shaft located in a direction normal to the longitudinal axis of the chuck to provide a substantially easier operation than prior art standard screw drive threaded nut means.

A further object of this invention is to provide an eccentric drive for the chuck tools to there thereby eliminate screw drive stresses normally applied to the gear wheels of milling machines.

A still further object of the invention is to provide a chuck for shank type tools wherein there is an improved observation of the work during use of the particular cutting tool.

Another object of this invention is to provide a continuous clamping effect through the inclusion of a flexible member which acts upon the clamping device.

A still further object of this invention is to provide a chuck for clamping shank type cutting tools requiring a low turning force for rapid clamping and loosening of the tool in the chuck.

The chuck of the instant invention is provided with a cone shaped adapter sleeve and a clamping element operating on the sleeve in a longitudinal direction. An eccentric shaft is mounted in the chuck housing in a direction normal to the chuck longitudinal axis. The eccentric shaft acts on the adapter sleeve which is mounted in the housing and is longitudinally displaceable therein. A flexible member may be placed between the eccentric shaft and the adapter sleeve to assist in the longitudinal displacement of the adapter sleeve by the eccentric shaft. The chuck for clamping shank type tools as disclosed in this invention requires less than one-twentieth of the clamping force required in the standard screw drive prior art chucks. Through the use of the flexible member, a relatively small eccentric lift is sufficient to tighten the chuck. In this invention the eccentric lift may be from about 1.5 to 2 mm.

The chuck of this invention is provided with a clamping piece which acts on the flexible member. The clamping piece has an oval bore in which the eccentric shaft surrounded by a cylindrical sleeve is mounted. The eccentric shaft may be mounted within the cylindrical sleeve and chuck housing through the use of contact bearings such as needle bearings. The rotation of the eccentric shaft within the oval bore through the use of the needle bearings contributes to the improvement of the overall efficiency of the chuck because of the elimination of deleterious friction losses. The resulting elimination of the deleterious friction losses provides additional frictional forces on the tool shank which are from about 20 to 25 times greater than those previously obtained on prior art chucks. The bore in the clamping device is oval shaped so that the final clamping and loosening position of the eccentric is fixed and secured against any undesired movement.

Further improvement of the clamping effect may be accomplished by insuring the accurate alinement of the adapter sleeve during rotation while under clamping pressure. To accomplish this, a holding sleeve is provided in the chuck housing adjacent the adapter sleeve. Each of the sleeves has conical surfaces which are in contact and are movable with respect to each other. Each of the sleeves has a separated structure by virtue of a continuous longitudinal slot. Each sleeve may be provided with notches along the internal and/or external perimeter. The notches may extend along the entire length of each sleeve and be separated by fixed narrow legs. In the use of this structure, the legs move into notches parallel to the sleeve axis and in this way provide easy flexible deformability of the sleeves. The notched, conically shaped sleeves provide an extraordinarily favorable surface connection between the tool shank, clamping sleeves and the main bore of the chuck housing. This particular structure contributes to increased utilization of the clamping force applied to the chuck.

BRIEF DESCRIPTION OF DRAWINGS

Other objects of this invention will appear in the following description and appended claims, reference being made to the accompanying drawings forming a part of the specification wherein like reference characters designate corresponding parts in the several views.

In the accompanying drawings, wherein illustrative embodiments of the invention are disclosed.

DESCRIPTION OF SPECIFIC EMBODIMENT

Figure 5:
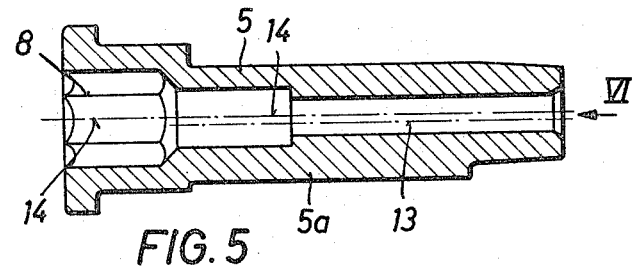
FIG. 5 shows a longitudinal sectional view of an eccentric shaft of a chuck made in accordance with this invention.
Figure 7:
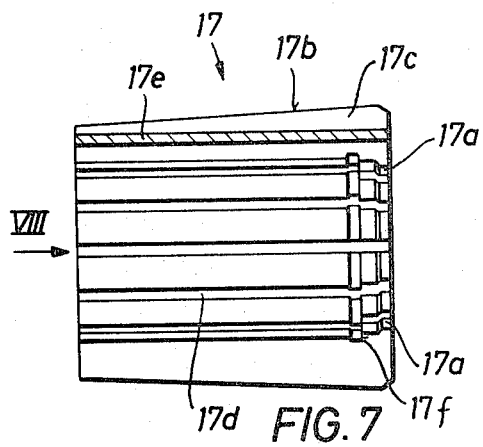
FIG. 7 is a longitudinal sectional view of the adapter sleeve of FIGS. 1 and 2.
Figure 8:
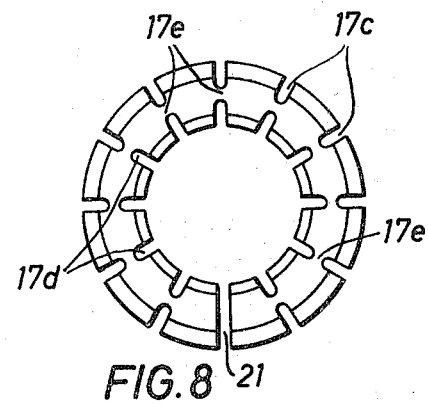
FIG. 8 is an end view of the said adapter sleeve in the direction VIII of FIG. 7.
Figure 9:
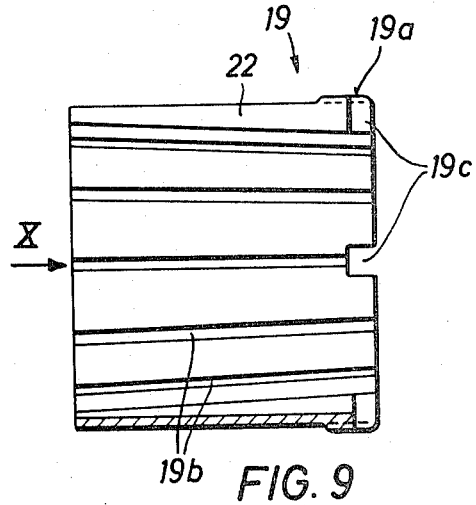
FIG. 9 is a longitudinal sectional view of the holding sleeve as shown in FIGS. 1 and 2.
Figure 10:
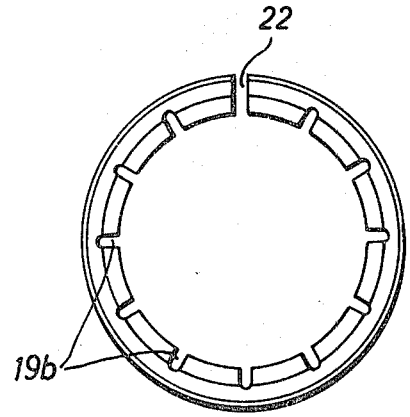
FIG. 10 is an end view of the holding a sleeve in the direction X of FIG. 9.

The chuck, generally designated 1, has a housing 2 with a clamping piece 3 mounted therein. The clamping piece 3 engages the said housing 2 by means of a pivot end 3a in a corresponding bore section, and is longitudinally movable within the said housing 2. The clamping piece 3 includes a transverse bore 4. An eccentric shaft 5 surrounded by a sleeve 6 is rotatably mounted within the transverse bore 4. Needle bearings 7 are provided between the said shaft 5 and sleeve 6 to reduce friction for the movement of shaft 5. The shaft 5 has an internal hexagonal head 8 at one end thereof. A bushing 9 surrounds the other end of shaft 5 within the chuck 1. An inner hexagonal head screw 10 secures the bushing 9 to the conical end of the shaft 5. The eccentric shaft 5 is mounted in the transverse bore 12 of housing 2 at the hexagonal head 8 and bushing 9. Needle bearings 11 are placed between the shaft 5 and transverse bore 12 to facilitate movement between these parts. The shaft 5 has an eccentric cylinder body portion 5a having an eccentric axis 13. The eccentric axis 13 is parallel to the longitudinal axis 14 of the shaft 5 shown passing through the inner hexagonal head 8 in FIG. 5. The transverse bore 4 is kept horizontally oval so that the recess 4a is formed alongside the circular sleeve 6. Eccentricity of the recess 4a is about 0.3 mm. and comparable with axes 13 and 14.

A threaded shoulder 3b is located at the lower end of the clamping piece 3. An inner hexagonal nut 15 is screwed onto the threaded shoulder 3b. A flexible member, cup springs 16 in this embodiment, is located on the cylindrical external diameter of the hexagonal nut 15. The cup springs 16 are pretensioned between the surfaces of the clamping piece 3 and the adapter sleeve 17. The tensioning of the cup springs 16 is effected by the movement of the inner hexagonal nut 15. The amount of tensioning in the specific embodiment is about one-half the permissible maximum tension available. The tool shank 18 is inserted into the adapter sleeve 17. The adapter sleeve 17 has a conical external periphery wherein the conical surface narrows as it approaches the tool having the tool shank 18. The cutters which are normally right hand spiral tighten up more securely by means of the ensuing axial force through the use of such an adapter sleeve 17.

The holding sleeve 19 provides several advantages. First, it is possible to use the tension of the cup springs 16 to the fullest advantage. Secondly, the changing of the adapter sleeve 17 is made easier. Furthermore, the holding sleeve 19 provides compensation for the diameter tolerances of the tool shank 18 and the various clamping elements. The holding sleeve 19 is designed just like the adapter sleeve 17 so that it fills the bore 20 of the chuck housing 2 thereby being accurately in rotation with the adapter sleeve 17 and tool shank 18. The holding sleeve 19 includes a threaded portion 19a for screwing into the housing 2 facilitating an axial adjustment. The axial adjustment of sleeve 19 provides for the compensation of manufacturing tolerances in the chuck 1 and tool shank 18. In addition, the adjustability provides for a predetermined clamping force in accordance with a fixed or adjustable scale on the visible side of the sleeve 19 or at the lower end of the chuck body 2.

The conical shape of one-tenth on adapter sleeve 17 and holding sleeve 19 lies in the nonreversibility range. This shape characteristic provides automatic withdrawal of the adapter sleeve 17. The internal hexagonal nut 15 which is secured to the clamping piece 3 has an external collar 15a. The adapter sleeve 17 has a corresponding projecting shoulder 17a. The collar 15a of the inner hexagonal nut 15 fits the shoulder 17a of the adapter sleeve 17 thereby effecting substantial contact between the adapter sleeve 17 and the clamping piece 3. Collar 15a and shoulder 17a are inclined with respect to each other so that on withdrawal of the adapter sleeve 17, a transverse force is applied to the adapter sleeve 17. This transverse force causes the bore of the adapter sleeve 17 to spread out for easier tool change.

The adapter sleeve 17 has a conical-shaped surface 17b on the outer periphery and includes a continuous slot 21. Notches 17c and 17d are located along the outer periphery and inner periphery, respectively, of the inner bore of the adapter sleeve 17. The notched structure includes narrow legs 17e which give the adapter sleeve 17 a unified structure. There are eleven notches 17c and 17d along the outer and inner surfaces, respectively, of the adapter sleeve 17 thereby providing an effective means for flexibly deforming the said sleeve 17. A collar 17f located on the inner surface of the adapter sleeve 17 limits the movement of the tool shank 18 into the adapter sleeve 17.

The holding sleeve 19 also has a continuous longitudinal slot 22 which divides the holding sleeve 19 along one side. The holding sleeve 19 includes notches 19b which extend the whole length of the holding sleeve 19 along its inside surface. A further embodiment of the holding sleeve 19 could also include notches along the outside surface thereof such as are provided on the outside surface of the adapter sleeve 17. The holding sleeve 19 includes grooves 19c which run cruciform and serve to take a key for the adjustment of the holding sleeve 19 within the bore 20 of the housing 2.

Figure 1:
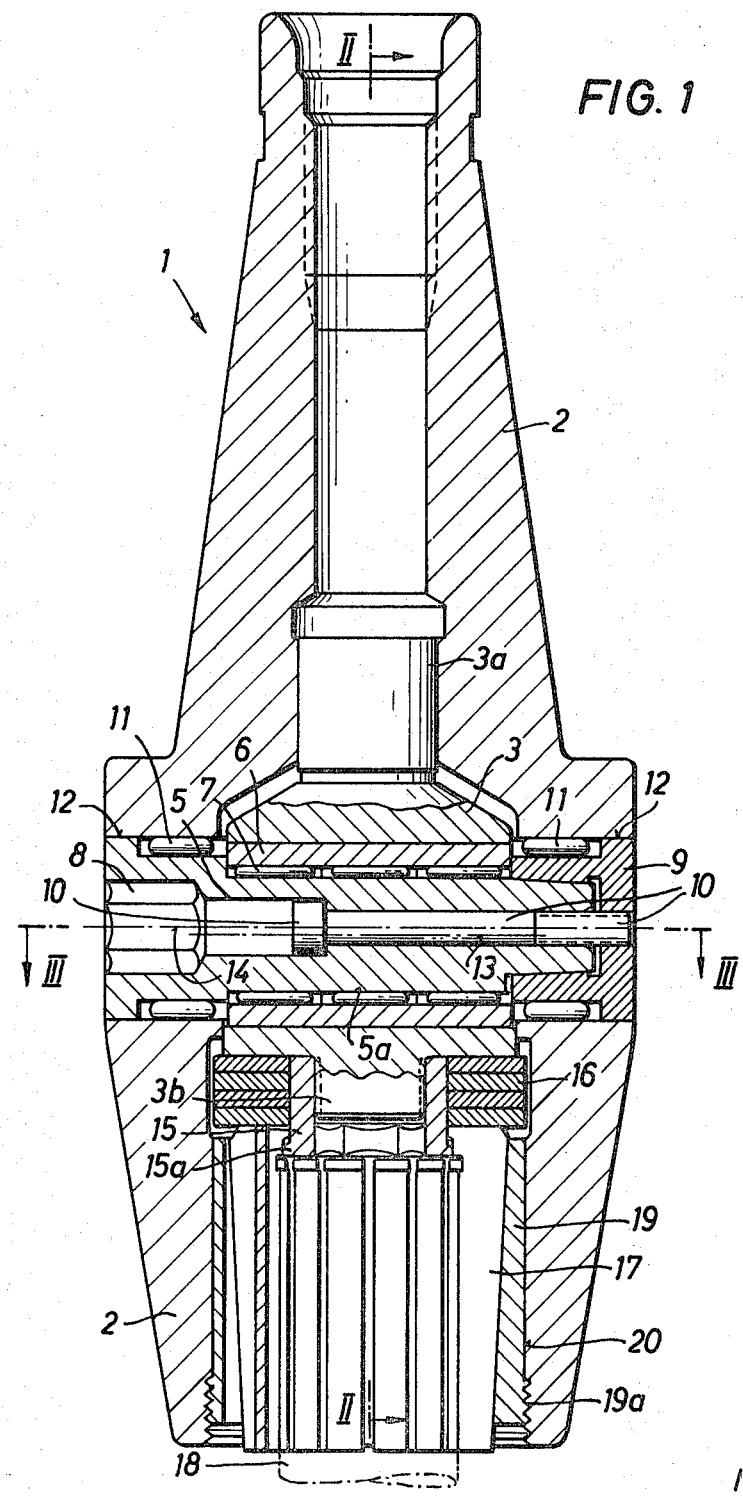
FIG. 1 shows a longitudinal section of a chuck made in accordance with this invention having an adapter sleeve in the clamped position.
Figure 2:
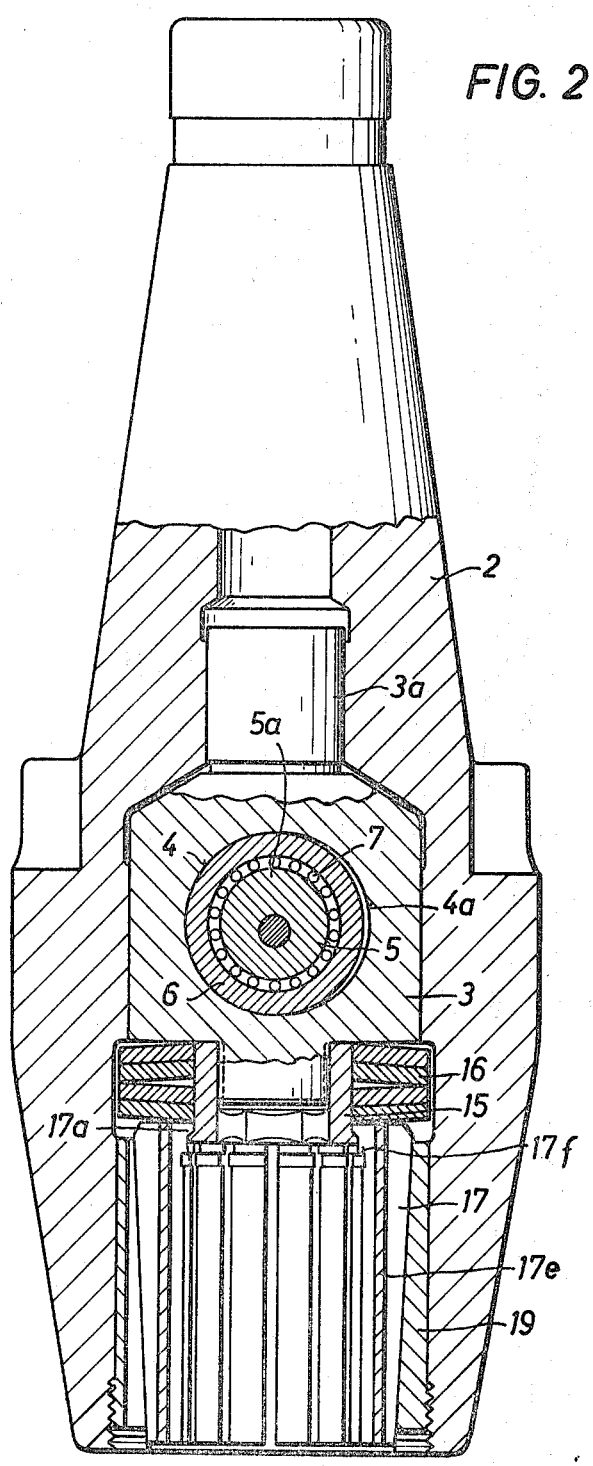
FIG. 2 shows a longitudinal sectional view along the line II–II of FIG. 1 with the adapter sleeve in a loosened position.
Figure 3:
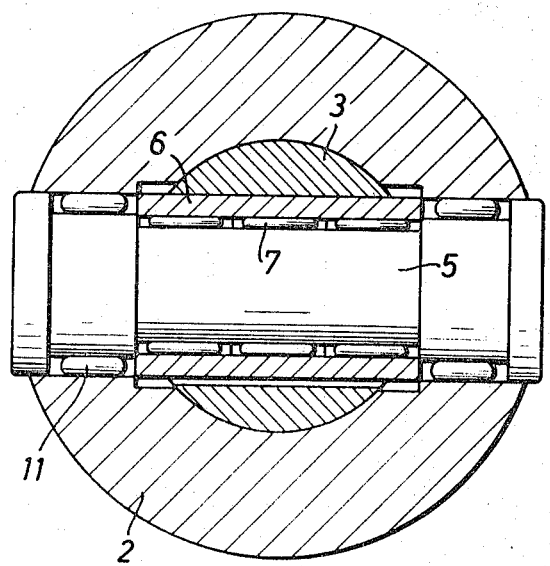
FIG. 3 is a cross-sectional view along the line III–III of FIG. 1.
Figure 4:
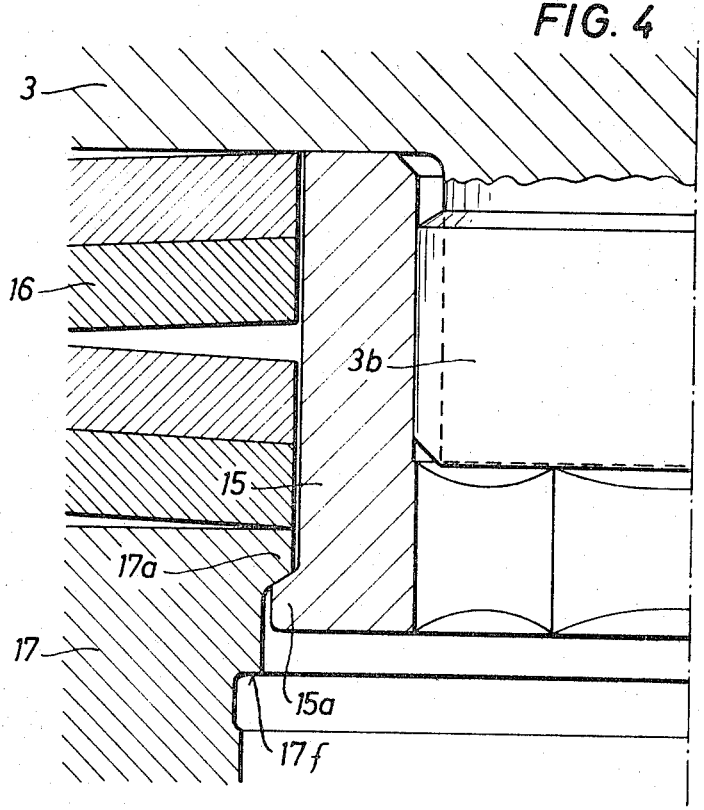
FIG. 4 shows an enlarged detailed view of the adapter sleeve shown in FIGS. 1 and 2.
Figure 6:
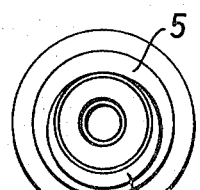
FIG. 6 is an end view of the said eccentric shaft in the direction VI OF FIG. 5.

In operation, the eccentric shaft 5, 5a of the chuck 1 is first turned to the left by inserting a two-ended inner hexagonal key into the inner hexagonal head 8. The shaft 5, 5a is placed in an upper end position as seen in FIG. 2. The resultant upward movement of the clamping piece 3 causes the cup springs 16 to be tensioned to a point determined by the location of inner hexagonal head 15 on the pivot end 3a. The tool shank 18 is then guided into the adapter sleeve 17. The eccentric shaft 5, 5a is then turned in a clockwise direction within the sleeve 6 by way of the needle bearings 7. The sleeve 6 hobs in the oval bore 4, 4a and pushes the clamping piece 3 downward thereby pressing onto the top surface of the adapter sleeve 17 through the tensioned cup springs 16. This adapter sleeve 17 is thus gradually pressed into the cone of the holding sleeve 19 until the clamping force on the tool shank 18 reaches the desired amount. This clamping force is applied on the conical surfaces of the adapter sleeve 17 and the holding sleeve 19 and along the cylindrical surface between the holding sleeve 19 and the bore 20 of the housing 2. Experience has shown that the ratio of the clamping moments to loosening moments can be improved from 1:1 1:1 to about 1:20 to 1:25 with the clamping device of this invention. The eccentric shaft 5, 5a can be turned about 200°. After turning this far, the eccentric midpiece 5a locates a stop about 10° behind the highest clamping position within the oval bore 4, 4a. This stop limits turning to the right and blocks inadvertent turning to the left with the aid of the cup springs 16. The springs 16 are tensioned to about one-half of the maximum tension in this embodiment. To loosen the chuck 1, the eccentric shaft 5, 5a is turned counterclockwise. The counterclockwise turning of the shaft 5, 5a causes the clamping piece 3 to be withdrawn together with the inner hexagonal nut 15 until the collar 15a and shoulder 17a meet. The withdrawal of the clamping piece 3 releases the springs 16 to the amount of its pretensioning. With further withdrawal of the clamping piece 3, the collar 15 pulls over the shoulder 17a. At the same time, the inner diameter of the adapter sleeve 17 is increased by the radial components on the collars 15a and the shoulder 17a so that tool changing may be easily made possible.

While the chuck for shank type tools has been shown and described in detail, it is obvious that this invention is not to be considered as being limited to the exact form disclosed, and that changes in detail and construction may be made therein within the scope of what is claimed, without departing from the spirit of this invention.

I claim:

1. A chuck for shank type tools comprising, in combination:
   a. a chuck housing;
   b. means mounting a clamping element within said housing;
   c. means connecting a radially displaceable adapted sleeve means to said clamping element;
   d. said clamping element including an eccentric shaft mounted in said housing and having an axis located in a direction normal to the longitudinal axis of the said chuck;
   e. a flexible member interposed between the eccentric shaft and the adapter sleeve means within said chuck housing; and
   f. means to rotate said eccentric shaft to effect the longitudinal displacement of said clamping element to cause the opening and closing of the said adapter sleeve means around a tool shank.

2. A chuck as defined in claim 1 wherein said flexible member is a set of cup springs.

3. A chuck as defined in claim 2 wherein said clamping element includes a sleeve member mounted in a transverse oval bore, said eccentric shaft being located within said sleeve.

4. A chuck as defined in claim 3 wherein said rotating means include contact bearings interposed between said eccentric shaft and said chuck housing.

5. A chuck as defined in claim 1 including:

means mounting a longitudinally displaceable holding sleeve having a counter cone surface within said housing juxtaposed the adapter sleeve means; and
   the said adapter sleeve means having a conical shape which narrows in a direction away from the chuck housing.

6. A chuck as defined in claim 5 wherein:
   said adapter sleeve means includes a shoulder portion and said clamping element includes a collar portion; and
   said shoulder and collar portions being located with respect to each other to engage during the withdrawal of said adapter sleeve means to provide locking between the respective parts.

7. A chuck as defined in claim 6 wherein said adapter sleeve means includes a continuous slot completely through its structure along its entire length and notches along at least one of the inner and outer surfaces of said adapter sleeve.

8. A chuck as defined in claim 7 wherein said holding sleeve includes a continuous slot completely through its structure and along its entire length and notches along at least one of the inner and outer surfaces of said holding sleeve.

9. A chuck as defined in claim 3 wherein the eccentric surface of said eccentric shaft and said sleeve member extend between opposite sides of said clamping element whereby upon rotation said eccentric shaft applies even pressure across the entire width of said clamping element.